United States Patent

[11] 3,596,033

| [72] | Inventors | John L. Wickham<br>Glen Arm;<br>George W. Cowman, Baltimore, both of, Md. |
|---|---|---|
| [21] | Appl. No. | 853,289 |
| [22] | Filed | Aug. 27, 1969 |
| [45] | Patented | July 27, 1971 |
| [73] | Assignee | Black and Decker Manufacturing Company<br>Towson, Md. |

[54] SWITCH DUST GUARD FOR RADIAL ARM SAW
11 Claims, 4 Drawing Figs.

[52] U.S. Cl. .................................................. 200/168 G
[51] Int. Cl. .................................................. H01h 9/04
[50] Field of Search ....................................... 200/168 G, 172 A, 153.19

[56] References Cited
UNITED STATES PATENTS

| 2,984,726 | 5/1961 | Roeser | 200/168 G |
| 3,076,070 | 1/1963 | Millerwise | 200/168 G X |
| 3,086,090 | 4/1963 | Carroll | 200/168 G X |
| 3,305,660 | 2/1967 | Sohns et al. | 200/168 G X |
| 3,414,693 | 12/1968 | Watson et al. | 200/168 G X |

*Primary Examiner*—H. O. Jones
*Attorneys*—Leonard Bloom and Joseph R. Slotnik

ABSTRACT: A radial arm saw including a base having an upstanding post supported thereon. An arm extends over a horizontal work table supported upon the base and has a carriage suspended therefrom for movement therealong. A motor-powered saw is fixed to the carriage and is adapted to cut workpieces on the table. The arm is adapted to be pivoted about a vertical axis and is vertically adjustable to vary the angle and depth of cut, respectively, on workpieces on the table. A control mechanism including a movable switchbox is electrically connected to the saw motor and carriage and is constructed to control operation of the saw and carriage. The switchbox has one or more pushbutton switches provided with novel means to prevent contamination thereof by dust, chips, and other foreign matter.

PATENTED JUL 27 1971    3,596,033
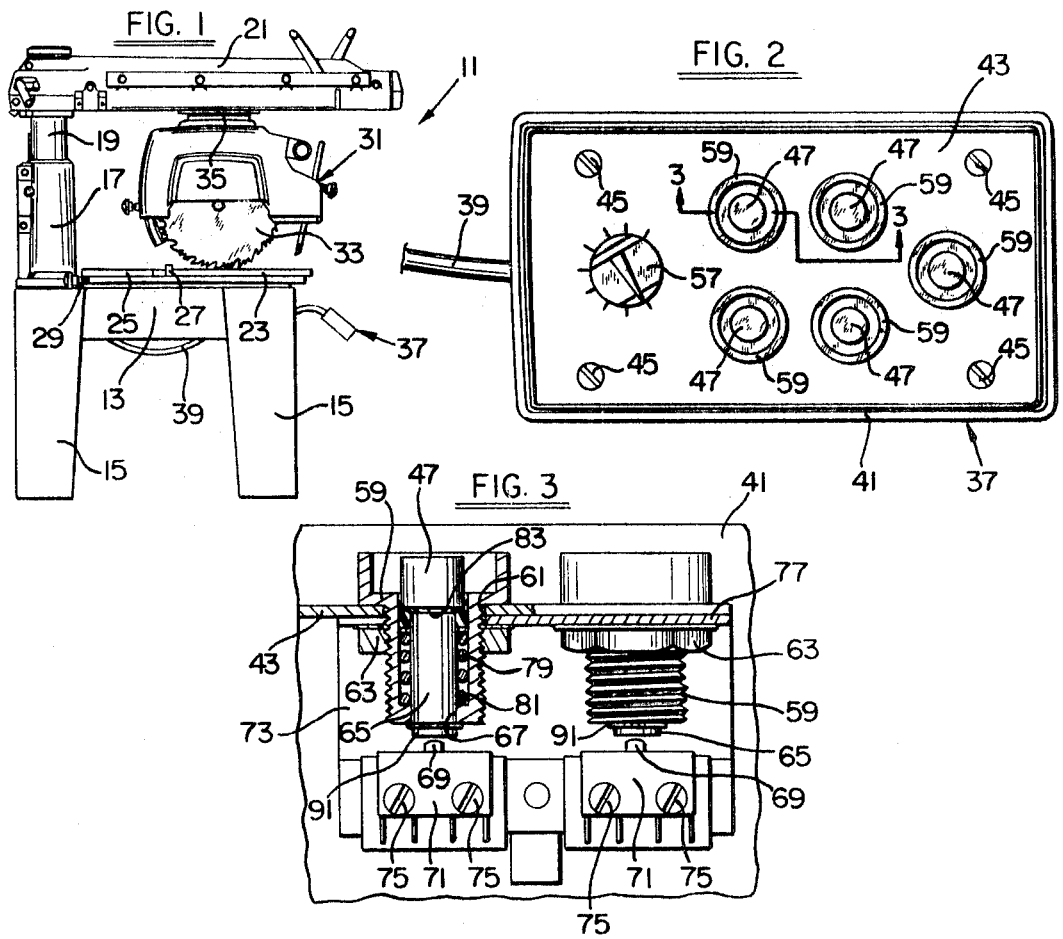
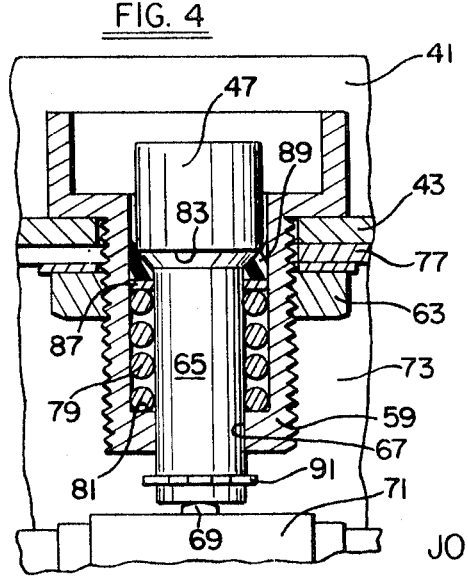
INVENTORS
JOHN L. WICKHAM
GEORGE W. COWMAN
BY Joseph R. Slotnik
ATTORNEY

SWITCH DUST GUARD FOR RADIAL ARM SAW

SUMMARY OF THE INVENTION

This invention is directed to a pushbutton switch construction having a novel dust guard and adapted for use in installations where dust, dirt, chips and the like is a problem such as, for example, a portable switch box on a radial arm saw. The dust guard is simple but effective, inexpensive yet reliable, and prevents foreign matter from gaining access to the switch parts and possibly causing switch hangup.

Main objects of the present invention are to provide a pushbutton switch construction having a novel dust guard which prevents dust, dirt, chips, and other foreign matter from gaining access to the switch parts and thereby insures proper functioning of the movable switch parts.

Further important objects of the invention are to provide a novel dust guard construction of the above character which is relatively inexpensive and involves a minimum of parts, but is rugged in construction and reliable in use.

BROAD STATEMENT OF THE INVENTION

Broadly described, the present invention relates to a radial arm saw of the type having a base, upstanding column means supported upon said base, arm means extending from said column means and over a table supported by said base, and a saw carriage including an electric-motor-powered rotary saw supported for movement along said arm means; the improvement in said radial arm saw which comprises a portable control mechanism electrically connected to and adapted to control said electric motor, said control mechanism including housing means having at least one electric switch disposed internally thereof, a pushbutton slidably supported upon said housing means and having a first portion extending internally thereof and engageable with said switch, a second portion disposed externally of said housing for operator access, resilient sealing means interposed between said pushbutton and said housing means and preventing passage of dust, chips, and other foreign matter around said push button and into said housing means, said sealing means engaging outwardly tapered, radial shoulder means on said pushbutton, and means normally biasing said sealing means axially against said shoulder means, whereby said sealing means is held in tight sealing engagement with said housing means.

In another aspect, the present invention relates to a pushbutton switch comprising a housing, a switch fixed within said housing, means defining an opening in said housing adjacent said switch, a pushbutton slidably disposed in said opening for movement from a first to a second position and cooperable with means on said switch to actuate said switch, resilient sealing means snugly engaging said pushbutton and said opening to prevent passage of dust, chips, and other foreign matter past said pushbutton and into said housing, said sealing means engaging outwardly tapered, radial shoulder means on said pushbutton, and means normally biasing said sealing means axially against said shoulder means, whereby said sealing means is held in tight sealing engagement with said housing means.

Other objects and advantages of the present invention will become more apparent from a consideration of the detailed description to follow taken in conjunction with the drawings annexed hereto.

BRIEF DESCRIPTION OF THE DRAWINGS

FIG. 1 is a side elevational view illustrating a radial arm saw including a portable pushbutton switchbox embodying the present invention;

FIG. 2 is an enlarged plan view illustrating the portable pushbutton switchbox of FIG. 1;

FIG. 3 is an enlarged sectional view of FIG. 2 taken along the line 3-3 thereof; and FIG. 4 is an enlarged view of a portion of FIG. 3 showing the pushbutton depressed and actuating the switch.

DETAILED DESCRIPTION

Referring now specifically to the drawings, a radial arm saw embodying the present invention is illustrated generally at 11 in FIG. 1 and is seen to include a rigid table support 13 and legs 15 having a column base 17 secured thereto. A column 19 is supported within the base 17 and is adapted to be adjusted vertically therewithin such as by a suitable crank mechanism (not shown). A radial arm 21 is supported by the column 19 and extends over a worktable which includes a stationary portion 23, a removable portion 25, and a fence 17 held together by clamps 29. An electric-motor-powered saw 31 which includes a rotary blade 33 is suspended from a carriage 35 which is adapted to travel along the arm 21 to cut workpieces supported on the worktable. The depth of cut performed by the saw 31 is controlled by vertical adjustment of the column 19, and the arm 21 is pivotally adjustable about the longitudinal axis of the column 19 to vary the angle of travel of the carriage 35 relative to the fence 27 and therefore the angle of cut performed on a workpiece by the saw 31.

Control means for the saw 31 is provided by a switch box 37 which includes one or more pushbutton-type switches. A line cord 39 serves to connect these switches to suitable electric-powered drive means (not shown) for moving the carriage 35 and saw 31 along the radial arm. The switches may serve to initiate various controlling functions for the saw motor and carriage drive means such as forward, reverse and intermittent carriage travel, carriage stop, and emergency stop.

The switchbox 37 is portable in nature and has no permanent mounting, being only connected to the radial arm saw 11 by the line cord 39. Often, the switchbox 37 is set on the worktable where it is exposed to a shower of dust, chips, shavings, and other foreign matter. It will be appreciated that an accumulation of these materials can contaminate these pushbutton switches and cause them to hang up during use. Beyond simply causing the saw 11 to malfunction, switch hangup reduces or eliminates operator control over the saw and can represent danger to the tool and/or to the operator. To prevent this from occurring, each of the pushbutton switches is provided with novel sealing means which prevents dust, chips, shavings, and other foreign matter from contaminating them.

Turning now to FIGS. 2—4, the switchbox 37 is seen to include a hollow, generally cup-shaped body 41 having a top 43 secured therein by screws 45. A set of five switch pushbuttons 47, which, for example may control "forward" and "reverse" carriage travel, carriage "stop" and "jog," and an "emergency stop," and one dial control 57 for regulating carriage travel speed, are shown disposed in the switch top 43. The pushbuttons 47 are substantially identical and each is slidably disposed in a shouldered bushing 59 threaded in openings 61 in the top 43 and secured therein by locknuts 63. A lower reduced end 65 on each pushbutton is slidably guided in a reduced opening 67 in the associated bushing 59 and is disposed to engage a plunger 69 on an associated switch 71 located adjacent the pushbuttons 47.

The switches 71 may be secured in place in a variety of ways. For example, the switches 71 may be secured, in sets of one or two, to a mounting plate 73 by screws 75. A right-angle flange 77 on the plate 73 underlays the top 43 and is apertured to receive the bushing 59 for the associated pushbuttons and is trapped in place between the switch top 43 and the nuts 63.

The reduced end 65 of each pushbutton 47 is normally retracted from its associated switch plunger 69 under the influence of a compression spring 79 having one end engaged against a shoulder 81 at the lower end of the bushing 59. The other end of the spring 79 engages an annular washer 87 which is slidably disposed within the bushing 59 and is spaced from a tapered shoulder 83 at the end of the pushbutton reduced portion 65 by an annular sealing ring 89. This ring 89 may be constructed from a variety of suitable materials including flexible rubber and rubberlike substances and plastics. One other particularly suitable material is felt. The compressive force of the spring 79 and the tapered shoulder 83 acts on the sealing ring 89 and tends to compress it axially and expand it radially to maintain a snug relation between the ring 89 and the bushing 59 and pushbutton portion 65 even after the sealing ring 89 has worn. A snap ring 91 on the bottom of the pushbutton reduced portion 65 limits retraction of the push button 46.

It will be appreciated that the portable switchbox 37 from time to time is placed on the worktable. In general, the switchbox 37 is exposed to a spray of dust, chips and other foreign matter which, if allowed to enter the switchbox 37 around the pushbutton 47 could cause any one or more of these buttons to stick or hang up. The sealing ring 89, however, prevents entry of this foreign matter and therefore keeps the pushbuttons 47 operating freely.

By the foregoing, there has been disclosed a novel dust guard construction for a pushbutton switch calculated to fulfill the inventive objects hereinabove set forth, and while a preferred embodiment has been set forth, various additions, substitutions, modifications, and omissions may be made thereto.

I claim:

1. In a radial arm saw of the type having a base, upstanding-column means supported upon said base, arm means extending from said column means and over a table supported by said base, and a saw carriage including an electric-motor-powered rotary saw supported for movement along said arm means; the improvement in said radial arm saw which comprises a portable control mechanism electrically connected to and adapted to control said electric motor, said control mechanism including housing means having at least one electric switch disposed internally thereof, a pushbutton slidably supported upon said housing means and having a first portion extending internally thereof and engageable with said switch, a second portion disposed externally of said housing means for operator access, resilient sealing means interposed between said pushbutton and said housing means and preventing passage of dust, chips, and other foreign matter around said pushbutton and into said housing means, said sealing means engaging outwardly tapered, radial shoulder means on said pushbutton, and means normally biasing said sealing means axially against said shoulder means, whereby said sealing means is held in tight sealing engagement with said housing means.

2. The improvement of claim 1 which includes a plurality of pushbuttons slidably supported upon said housing means, each of said pushbuttons having one of said sealing means interposed between said pushbutton and said housing means.

3. The improvement of claim 1 wherein said biasing means includes a compression spring normally biasing said pushbutton in one direction, said sealing means being trapped axially between said spring and said shoulder means on said pushbutton.

4. The improvement of claim 3 wherein said sealing means includes an annular member constructed from a material selected from the class consisting of flexible rubber and plastics, and felt.

5. The improvement of claim 3 wherein said housing means has an annular bushing supported thereon, said pushbutton being slidable in said bushing, said sealing means being movable with said pushbutton and slidably engageable with said bushing.

6. The improvement of claim 5 wherein said spring is caged between a radial shoulder on said bushing and said sealing means.

7. A pushbutton switch comprising a housing, a switch fixed within said housing, means defining an opening in said housing adjacent said switch, a pushbutton slidably disposed in said opening for movement from a first to a second position and cooperable with means on said switch to actuate said switch, resilient sealing means snugly engaging said pushbutton and said opening to prevent passage of dust, chips, and other foreign matter past said pushbutton and into said housing, said sealing means engaging outwardly tapered, radial shoulder means on said pushbutton, and means normally biasing said sealing means axially against said shoulder means, whereby said sealing means is held in tight sealing engagement with said opening.

8. A switch as defined in claim 7 wherein said opening defining means includes an annular bushing secured to said housing and slidably supporting said pushbutton.

9. A switch as defined in claim 7 wherein said sealing means includes a flexible annular member surrounding said pushbutton, said biasing means includes a compression spring normally biasing said pushbutton toward said first position and axially compressing said annular sealing member, whereby to maintain said sealing member in close engagement with said pushbutton and said opening.

10. A switch as defined in claim 9 wherein said spring and said sealing member are caged between said shoulder means on said pushbutton and said opening.

11. A switch as defined in claim 9 wherein said flexible annular member is constructed of a material selected from the group consisting of flexible rubber and plastics, and felt.